United States Patent
Bilinski et al.

(10) Patent No.: US 8,495,237 B1
(45) Date of Patent: Jul. 23, 2013

(54) TECHNIQUES FOR PROVIDING A MEDIA STREAM TO A MOBILE COMPUTING DEVICE BASED ON A PREDICTED ROUTE OF THE MOBILE COMPUTING DEVICE

(71) Applicant: Google Inc., Mountain View, CA (US)

(72) Inventors: Brandon Bilinski, San Francisco, CA (US); Jai John Mani, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/629,026

(22) Filed: Sep. 27, 2012

(51) Int. Cl.
*G06F 13/00* (2006.01)

(52) U.S. Cl.
USPC .......................... 709/231; 709/224; 709/232

(58) Field of Classification Search
USPC .................... 709/223, 224, 230, 231, 232
See application file for complete search history.

(56) References Cited

U.S. PATENT DOCUMENTS

| | | | |
|---|---|---|---|
| 7,127,213 B2 | 10/2006 | Haymes et al. | |
| 7,962,182 B2 | 6/2011 | Kwan et al. | |
| 7,991,904 B2 | 8/2011 | Melnyk et al. | |
| 2004/0186733 A1 | 9/2004 | Loomis et al. | |
| 2006/0140180 A1 | 6/2006 | Du Breuil | |
| 2007/0091920 A1 | 4/2007 | Harris et al. | |
| 2008/0191816 A1 | 8/2008 | Balachandran et al. | |
| 2010/0121977 A1* | 5/2010 | Kontola et al. | 709/232 |

* cited by examiner

*Primary Examiner* — Viet Vu
(74) *Attorney, Agent, or Firm* — Remarck Law Group PLC

(57) ABSTRACT

Techniques for providing a media stream to a mobile computing device based on a predicted route of the mobile computing device include obtaining a predicted route of the mobile computing device and determining whether the predicted route travels through an area of reduced network capabilities. If the predicted route travels through the area, the techniques include determining whether to adjust the bit rate encoding of the media stream such that playback of the media stream is not interrupted.

20 Claims, 6 Drawing Sheets

TECHNIQUES FOR PROVIDING A MEDIA STREAM TO A MOBILE COMPUTING DEVICE BASED ON A PREDICTED ROUTE OF THE MOBILE COMPUTING DEVICE

FIELD

The present disclosure relates to techniques for providing a media stream to a mobile computing device based on a predicted route of the mobile computing device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Mobile computing devices (laptop computers, mobile phones, tablet computers, etc.) can be configured to receive media content from a cloud-based media service. For example, some cloud-based media services allow users to store media files (audio files, video files, etc.) at a server. A user can request one or more specific media files to be transmitted or "streamed" to the mobile computing device. The server encodes the requested media files at a specific bit rate to obtain a media stream, and provides the media stream to the mobile computing device via a network, e.g., the Internet.

When a user of a mobile computing device is traveling, the mobile computing device may travel through areas where the capabilities of the network are reduced. For example, a mobile computing device may travel through a "dead zone" in a cellular network in which there is limited or no access to the network. When traveling through an area of reduced network capabilities, delivery of the media stream may be interrupted. Such interruptions may decrease the experience of the user if the mobile computing device is required to pause playback of the media stream, e.g., to perform a buffering operation.

SUMMARY

According to various embodiments of the present disclosure, a computer-implemented technique for providing a media stream to a mobile computing device is disclosed. The technique can include providing, from a server including one or more processors, the media stream encoded at a first bit rate to the mobile computing device. A predicted route of the mobile computing device can be obtained at the server. The predicted route can correspond to a route likely to be traveled by the mobile computing device. Additionally, the server can determine whether the predicted route travels through an area of reduced network capabilities. When the predicted route travels through the area of reduced network capabilities, the technique can further include providing, from the server, the media stream encoded at a second bit rate lower than the first bit rate to the mobile computing device before the mobile computing device enters the area of reduced network capabilities.

The technique can further include determining, at the server, an estimated amount of time for the mobile computing device to travel through the area of reduced network capabilities. Also, the technique can include obtaining, at the server, a buffer size of a media buffer of the mobile computing device. Based on the first bit rate, the second bit rate, the estimated amount of time, and the buffer size, the technique can include determining an amount of media stream encoded at the second bit rate to be provided. The technique can further include determining, at the server, a time to begin providing the media stream encoded at the second bit rate based on the amount of media stream and the first bit rate. The server can begin to provide the media stream encoded at the second bit rate at the determined time.

In some embodiments, the technique can include obtaining, at the server, a coverage map indicating one or more areas of reduced network capabilities. The determination of whether the predicted route travels through the area of reduced network capabilities can be further based on the coverage map. The technique can further include maintaining, at the server, a locations database that stores realized network capabilities that have been realized at a plurality of different locations by a plurality of reporting mobile computing devices. In some example techniques, obtaining the coverage map may include generating the coverage map based on the realized network capabilities. The realized network capabilities at a specific location of the plurality of different locations include at least one of: (i) a signal strength realized by a specific reporting mobile computing device of the plurality of reporting mobile computing devices at the specific location; (ii) a realized bandwidth realized by the specific reporting mobile computing device at the specific location; and (iii) an indication that a buffering operation was performed by the specific reporting mobile computing device at the specific location.

In some embodiments, another computer-implemented technique is disclosed. The technique can include providing, from a server including one or more processors, a media stream encoded at a first bit rate to a mobile computing device. The technique can further include obtaining, at the server, a predicted route of the mobile computing device, the predicted route corresponding to a route likely to be traveled by the mobile computing device and determining, at the server, whether the predicted route travels through an area of reduced network capabilities. When the predicted route travels through the area of reduced network capabilities, the technique can include: (i) obtaining, at the server, a network performance estimate corresponding to a data rate that the mobile computing device is expected to receive within the area of reduced network capabilities; (ii) determining, at the server, an estimated amount of time for the mobile computing device to travel through the area of reduced network capabilities, and (iii) determining, at the server, a playback time of a media buffer of the mobile computing device based on a buffer size of the media buffer and the network performance estimate. The playback time may correspond to an amount of time to exhaust the media buffer when the mobile computing device is traveling in the area of reduced network capabilities. When the playback time value is less than the estimated amount of time, the technique can include: (i) determining, at the server, a second bit rate for encoding the media stream based on the buffer size and the estimated amount of time, the second bit rate being less than the first bit rate, (ii) determining, at the server, a time to begin providing the media stream encoded at the second bit rate based on the buffer size, the estimated amount of time, the first bit rate, and the second bit rate, and (iii) beginning to provide, from the server, the media stream encoded at the second bit rate to the mobile computing device at the time.

In some embodiments, the technique can further include determining, at the server, a first amount of data and a second amount of data to be stored in the media buffer when the mobile computing device is traveling through the area of reduced network capabilities. The first amount of data can correspond to the media stream encoded at the first bit rate and the second amount of data can correspond to the media stream encoded at the second bit rate, wherein the first amount of data and the second amount of data are determined such that the playback time is greater than or equal to the estimated amount of time. Further, determining the first amount of data and the second amount of data can comprise prioritizing the first amount of data over the second amount of data. The second amount of data can be determined based on:

$$A = \frac{b_2(T*b_1 - S)}{b_1 - b_2}$$

where A is the second amount of data, T is the estimated amount of time, $b_1$ is the first bit rate, $b_2$ is the second bit rate, and S is the buffer size.

Furthermore, the technique can include obtaining, at the server, a coverage map indicating one or more areas of reduced network capabilities, including the area of reduced network capabilities, wherein the determining whether the predicted route travels through the area of reduced network capabilities is based on the coverage map. Additionally, the technique can include maintaining, at the server, a locations database that stores realized network capabilities that have been realized at a plurality of different locations by a plurality of reporting mobile computing devices, wherein obtaining the coverage map further comprises generating, at the server, the coverage map based on the realized network capabilities.

According to various embodiments of the present disclosure, the technique can include providing, from a mobile computing device including one or more processors, a first request for a media stream encoded at a first bit rate to a server. Additionally, the technique can include receiving, at the mobile computing device, the media stream encoded at the first bit rate and obtaining, at the mobile computing device, a predicted route of the mobile computing device. The predicted route can correspond to a route likely to be traveled by the mobile computing device. The technique can further include determining, at the mobile computing device, whether the predicted route travels through an area of reduced network capabilities. When the predicted route travels through the area of reduced network capabilities, the technique can include providing, from the mobile computing device and to the server, a second request for the media stream encoded at a second bit rate, the second bit rate being lower than the first bit rate, the second request being provided before the mobile computing device travels through the area of reduced network capabilities; and receiving, at the mobile computing device, the media stream encoded at the second bit rate.

In some embodiments, the technique can further include determining, at the mobile computing device, an estimated amount of time for the mobile computing device to travel through the area of reduced network capabilities. An amount of media stream encoded at the second bit rate to be requested based on the first bit rate, the second bit rate, the estimated amount of time, and a buffer size of a media buffer of the mobile computing device can be determined. The second request can include the amount of media stream encoded at the second bit rate. The amount of media stream encoded at the second bit rate can be determined based on:

$$A = \frac{b_2(T*b_1 - S)}{b_1 - b_2}$$

where A is the amount of media stream encoded at the second bit rate, T is the estimated amount of time, $b_1$ is the first bit rate, $b_2$ is the second bit rate, and S is the buffer size.

In some embodiments, the technique can further include determining, at the mobile computing device, a time for the server to begin providing the media stream encoded at the second bit rate based on the first bit rate and the amount of media stream encoded at the second bit rate, wherein the second request includes the time. Additionally, the technique can include obtaining, at the mobile computing device, a coverage map indicating one or more areas of reduced network capabilities, including the area of reduced network capabilities, wherein the determining whether the predicted route travels through the area of reduced network capabilities is based on the coverage map.

In various embodiments, the technique can further include storing, at the mobile computing device, the media stream in a media buffer of the mobile computing device as the media stream is received from the server; playing, at the mobile computing device, the media stream stored in the media buffer; and monitoring, at the mobile computing device, an amount of data in the media buffer while the media stream is being played. When the amount of data in the media buffer is below a threshold, a buffering operation can be performed, at the mobile computing device. When the buffering operation is performed, the technique can include obtaining, at the mobile computing device, a current location of the mobile computing device, and reporting the current location to the server. Additionally, when the mobile computing device exits the area of reduced network capabilities, the technique can include providing, from the mobile computing device to the server, a third request for the media stream encoded at the first bit rate.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
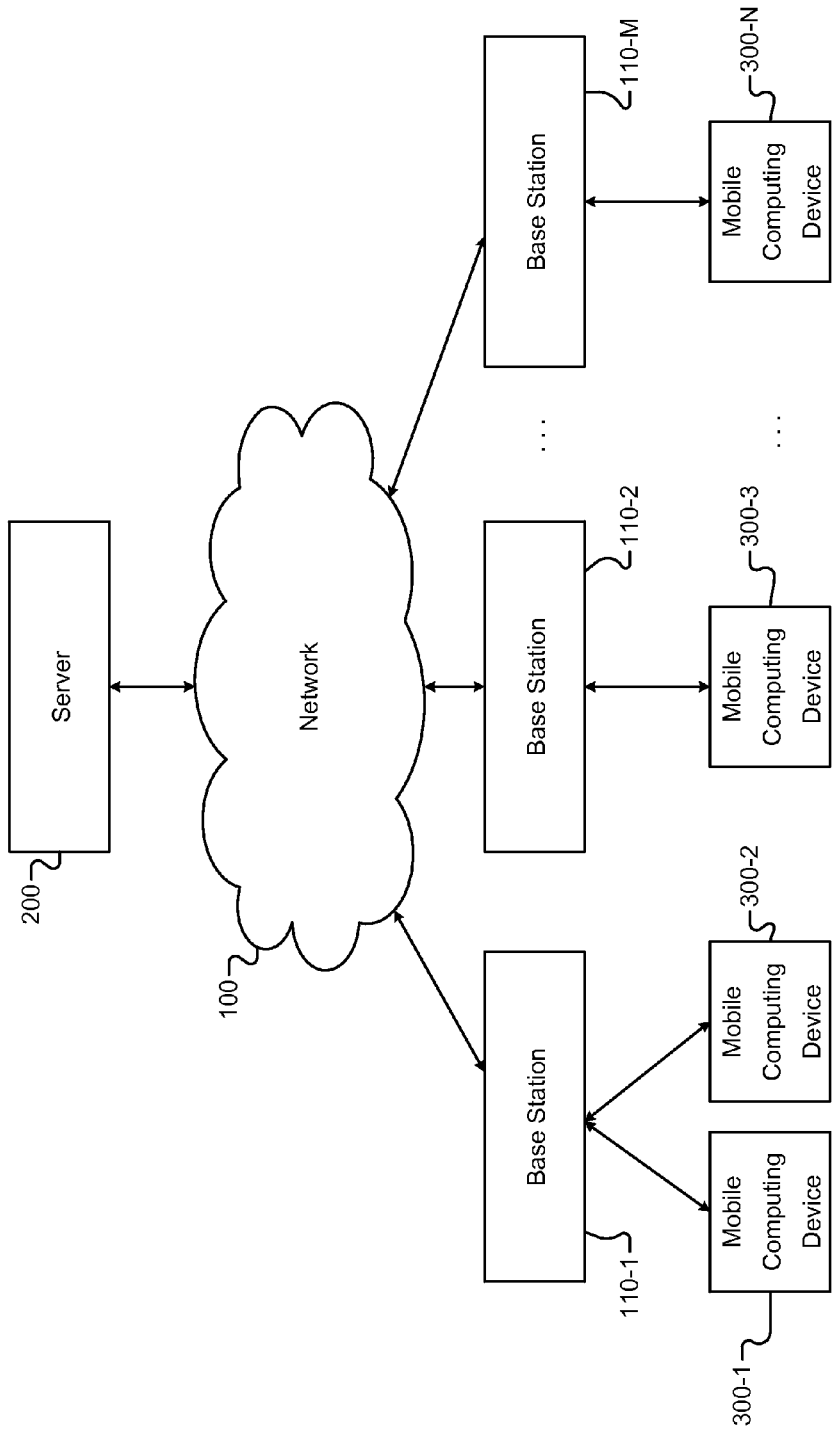
FIG. 1 is a drawing illustrating an example environment for providing a media stream, from a server, to a plurality of mobile computing devices according to some embodiments of the present disclosure.

FIG. 1 illustrates an example environment for providing a media stream from a server 200 to one or more mobile computing devices 300-1, 300-2, 300-3 ... 300-N (herein referred to individually or collectively by reference number 300) via a network 100. The network 100 can be any form of communication network or medium, such as a cellular network, an intranet, the Internet, or a combination thereof. The server 200 can provide the media stream to the mobile computing devices 300 via one or more base stations 110-1, 110-2 ... 110-M (herein referred to individually or collectively by reference number 110).

The server 200 can be any computing system that is configured to provide a media stream to a mobile computing device 300, such as a stand-alone server or a system of distributed servers. Example media streams include, but are not limited to, audio streams, such as Internet radio, and video streams, such as Internet television. The server 200 generates a media stream by encoding one or more media files into a media stream, which can then be provided or "streamed" to the mobile computing device 300. The server 200 can encode the media files in any suitable format, such as MP3 format (for audio files) and MPEG-4 (for video files). The server 200 can also encode the media files at any suitable bit rate. For example, the server 200 can encode MP3 media files at 320 kbps, 256 kbps, 192 kbps, or 96 kbps, with higher bit rates corresponding to higher quality.

Upon receiving a request to provide a media stream to a mobile computing device 300, the server 200 provides the media stream encoded at a particular bit rate to the mobile computing device 300. The server 200 can provide the media stream encoded at the highest available bit rate or at a bit rate specified by a user of the mobile computing device 300. In some embodiments, the server 200 is configured to obtain a predicted route of a mobile computing device 300 and to determine whether the predicted route travels through an area of reduced network capabilities. The predicted route is a route that is likely to be traveled by the mobile computing device 300. If the predicted route travels through an area of reduced network capabilities, the server 200 may provide the media stream encoded at a lower bit rate before the mobile computing device 300 reaches the area of reduced network capabilities. In some embodiments, the server 200 can determine an amount of the media stream encoded at the lower bit rate that is to be provided to the mobile computing device 300. As described more fully below, the server 200 can prioritize a higher bit rate over a lower bit rate such that the user experiences the highest quality media stream possible without interruption.

A mobile computing device 300 can be any type of computing device that can access the network 100, for example, a mobile telephone, a smartphone, a tablet computer, a laptop computer, a personal digital assistant (PDA), a mobile gaming device, a vehicle infotainment system, or a portable audio/video player. In the illustrated example, the mobile computing device 300 is configured to request, receive, and play a media stream. A user of the mobile computing device 300 may utilize a user interface of the mobile computing device 300 to request a media stream from the server 200. The mobile computing device 300 receives and buffers the media stream. When playing the media stream, the mobile computing device 300 can decode the received media stream and output an audio and/or video signal corresponding to the media stream.

In some embodiments, the mobile computing device 300 may be further configured to report network capabilities realized by the mobile computing device 300 and a location at which the network capabilities were realized. As used herein, the term realized network capabilities can include a signal strength, a bandwidth and/or a data throughput realized by the mobile computing device 300, and/or whether a buffering operation was performed by the mobile computing device 300. In some embodiments, the realized network capabilities are reported to the server 200. The realized network capabilities can be used by the server 200 to determine areas of reduced network capabilities.

As shown in the example of FIG. 1, the server 200 can provide a media stream to a mobile computing device 300 via a base station 110. A base station 110 can be a cell phone tower, a WiMax tower, a wireless gateway router or any other device that allows one or more mobile computing devices 300 to connect to the network 100. In the example of a cellular network, a cell phone tower may be configured to communicate with the mobile computing device 300 using one or more communication standards. A cell phone tower may operate according to the second generation mobile telecommunications standards (a "2G network"), the third generation mobile telecommunications standards (a "3G network"), the fourth generation mobile telecommunications standards (a "4G network"), or any later adopted telecommunications standards. As should be appreciated, 4G networks and 3G networks can provide higher data transfer rates than 2G networks. Thus, when connected to a 2G network, a mobile computing device 300 may realize reduced network capabilities in comparison to a 3G and 4G networks.

Figure 2:
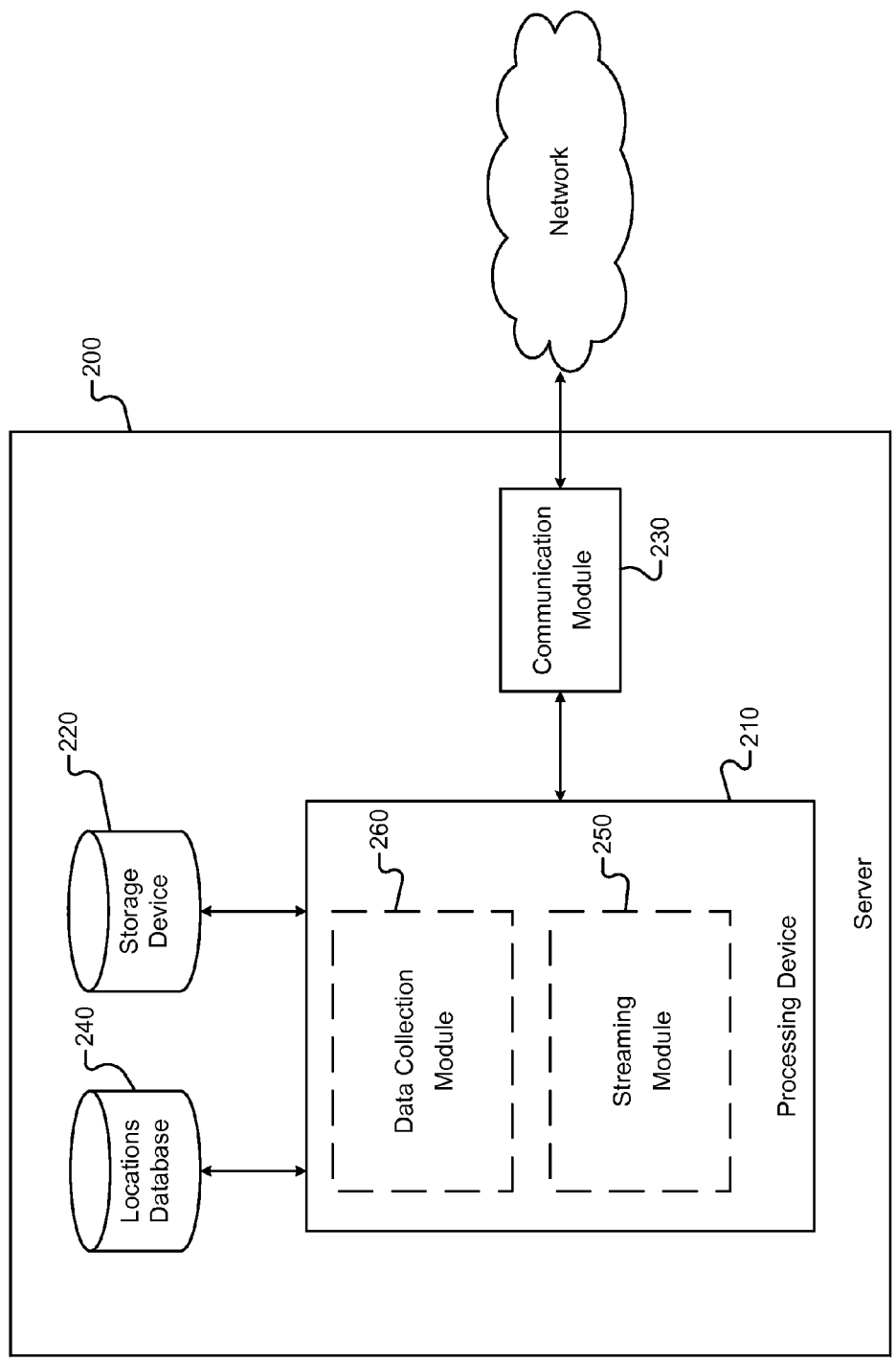
FIG. 2 is a block diagram illustrating example components of the server of FIG. 1.

Referring now to FIG. 2, an example of a server 200 configured to provide a media stream is depicted. In the illustrated example, the server 200 includes a processing device 210, a storage device 220, a communication module 230, and a locations database 240. The processing device 210 includes one or more processors that execute computer-readable instructions which cause the server 200 to perform its intended functionality. The processing device 210 is configured to communicate with the storage device 220, the communication module 230, and the locations database 240. In some embodiments, a streaming module 250 and a data collection module 260 are implemented at the processing device 210.

The storage device 220 can be any suitable memory device. The storage device 220 can include a content repository which stores media files. The communication module 230 enables communication between the server 200 and the network 100. The communication module 230 can be any suitable device for connecting to the network 100 and can include one or more Ethernet ports, wireless transceivers, and/or antennas. The communication module 230 can receive data from and transmit data to other devices connected to the network 100, including the mobile computing devices 300. The server 200 can further include a locations database 240. The locations database 240 can store realized network capabilities corresponding to different locations. In some embodiments, the locations database 240 may be stored on the storage device 220.

The data collection module 260 can receive realized network capabilities and locations indicating where the network capabilities were realized from various mobile computing devices 300. The data collection module 260 can store the realized network capabilities and the corresponding locations in the locations database 240 in any suitable manner. For example, the data collection module 260 can generate a database entry for a set of realized network capabilities such that the realized network capabilities and a location corresponding thereto are included in the database entry.

The data collection module 260 can further utilize the realized network capabilities and the corresponding locations to determine areas of reduced network capabilities. An area of reduced network capabilities can be an area where the network capabilities are sub-optimal. For example, an area of reduced network capabilities can be a geographic area where a majority of signal strengths, data throughputs and/or bandwidths realized within the area are below respective thresholds. Also an area of reduced capabilities may be an area where mobile computing devices 300 are known to perform buffering operations.

In some embodiments, the data collection module 260 can determine areas of reduced network capabilities by generating one or more coverage maps based on the contents of the locations database 240. The data collection module 260 can utilize the realized network capabilities and the corresponding locations stored in the locations database 240 to generate the coverage maps. The data collection module 260 can use analytical, statistical, and/or heuristic techniques to generate the coverage maps. The server 200 can store the coverage maps, e.g., in the storage device 220.

The streaming module 250 provides a media stream to a mobile computing device 300, e.g., in response to receiving a request. The streaming module 250 is configured to generate the media stream by encoding one or more media files stored in the storage device 220. The streaming module 250 can encode the media files in the storage device 220 at a high-quality bit rate and at one or more lower-quality bit rates.

In some embodiments, the streaming module 250 can determine at which bit rate to encode the media stream, e.g., based on whether the mobile computing device 300 will be traveling through an area of reduced network capabilities. To determine whether to provide the media stream encoded at the lower bit rate, the streaming module 250 can obtain a predicted route of the mobile computing device 300 and an indication of the area(s) of reduced network capabilities, e.g., the coverage map described above.

The streaming module 250 can obtain the predicted route from the mobile computing device 300 or from another source, e.g., a map server (not shown). The predicted route can be based on a route that was provided by the user, requested by the user, learned based on the tendencies of the user, or extrapolated from the current direction that the mobile computing device 300 is traveling. For example only, the server 200 can obtain the predicted route from the mobile computing device 300 executing a navigation application in which a user inputs a current location and a destination. Additionally or alternatively, the server 200 can utilize a classification or other machine learning process to determine a schedule of a user that can be utilized to determine a predicted route. For example only, a user may travel from a first location (home) to a second location (work) on a normal schedule (Monday-Friday at approximately 8 a.m.) along a specific route. Thus, the predicted route can be determined to be that specific route if the mobile computing device 300 departs from the first location at approximately the scheduled time.

In some embodiments, the predicted route can indicate a thoroughfare (a road, railway, trail, river, sidewalk, etc.) that is likely to be traveled by the mobile computing device 300. For example, if a user is traveling along a route that corresponds to a known thoroughfare (e.g., a river), the predicted route can be determined to correspond to the known path or potential paths (e.g., the course of the river and/or its tributaries) of that thoroughfare in the direction of travel of the mobile computing device 300. Furthermore, the predicted route can include the expected speed(s) of the mobile computing device 300 when traveling along the route.

If it is determined that the predicted route travels through an area of reduced capabilities, the streaming module 250 can determine whether to adjust the bit rate at which the media stream is encoded, e.g., in order to provide an uninterrupted media stream to the mobile computing device 300. For example, the streaming module 250 can determine an estimated amount of time for the mobile computing device 300 to travel through the area of reduced network capabilities. The estimated amount of time can, for example, be based on the predicted route and the expected speed(s) of the mobile computing device 300, as well as the size of the area of reduced network capabilities.

The estimated amount of time can be compared with an expected playback time of a media buffer 320 (see FIG. 3) of the mobile computing device 300. The expected playback time can correspond to the amount of time to exhaust the media buffer 320 when the mobile computing device 300 is traveling in the area of reduced network capabilities. In some embodiments, the expected playback time is based on a buffer size of the media buffer 320 and a network performance estimate in the area of reduced network capabilities. The network performance estimate can correspond to the expected throughput (or other network measurement) for the mobile computing device 300 in the area of reduced network capabilities. The network performance estimate can, e.g., be based on the realized network capabilities stored in the locations database 240. If the estimated amount of time exceeds the expected playback time, then the streaming module 250 can determine that a buffering operation may be performed when the mobile computing device 300 is traveling through the area of reduced network capabilities unless the bit rate of the media stream is reduced.

In order to avoid a buffering operation or an interruption in playback of the media stream, the streaming module 250 may determine to reduce the bit rate of the media stream. Furthermore, the streaming module 250 may determine the lower bit rate at which to encode the media stream to provide to the mobile computing device 300. In some embodiments, the streaming module 250 may select the lower bit rate for the media stream based on the estimated amount of time that the mobile computing device 300 is likely to be in the area of reduced network capabilities and the buffer size of the media buffer 320. For example, the streaming module 250 may prioritize the highest available bit rate at which the mobile computing device 300 will be able to travel through the area of reduced network capabilities without performing a buffering operation.

The streaming module 250 can further determine the amount of media stream encoded at the lower bit rate based on the higher bit rate, the lower bit rate, the buffer size of the media buffer 320, and the estimated amount of time that the mobile computing device 300 is expected to travel in the area of reduced network capabilities.

In some embodiments, the streaming module 250 determines the amount of media stream to be encoded at the lower bit rate based on:

$$t = \frac{T * b_1 - S}{b_1 - b_2} \quad \text{(Equation 1)}$$

where $b_1$ is the higher bit rate, $b_2$ is the lower bit rate, S is the buffer size of the media buffer 320, T is the estimated amount of time for the mobile computing device 300 to travel through the area of reduced network capabilities, and t is the approximate playback time of the media stream encoded at the lower bit rate desired. The amount of media stream encoded at the lower bit rate can be determined based on the product of t and $b_2$. Thus, in some embodiments the amount of media stream encoded at the lower bit rate can be determined based on:

$$A = \frac{b_2(T * b_1 - S)}{b_1 - b_2} \quad \text{(Equation 2)}$$

where A is the amount of media stream to be encoded at the lower bit rate. It should be appreciated that the amount of media stream to be encoded at the lower bit rate can be based on A (equation 2) or t (equation 1) while also including an additional factor to increase the likelihood that the mobile computing device 300 will experience an uninterrupted playback when traveling through the area of reduced network capabilities.

Once the amount of media stream encoded at the lower bit rate to provide to the mobile computing device 300 is determined, the streaming module 250 can provide the determined amount of media stream to the mobile computing device 300. In some embodiments, the streaming module 250 provides the media stream encoded at the lower bit rate prior to the mobile computing device 300 entering the area of reduced network capabilities. The streaming module 250 may also be configured to determine a time at which to begin providing the media stream at the lower bit rate based on the buffer size, the estimated amount of time, the higher bit rate, and the lower bit rate.

In some embodiments, the time at which to begin providing the media stream at the lower bit rate can be further based on the network performance estimate in the area of reduced network capabilities. For example, in an area of reduced network capabilities for which the network performance estimate indicates that the mobile computing device 300 will receive no data (a "dead zone"), the time can be determined such that the media buffer 320 will be loaded with the proper amount of media stream at the lower bit rate before entering the area of reduced network capabilities. Similarly, in an area of reduced network capabilities for which the network performance estimate indicates that the mobile computing device 300 will receive some limited amount of data, the time may be determined such that the media buffer 320 will be loaded with the proper amount of media stream at the lower bit rate within the area of reduced network capabilities.

The server 200 described above is provided as an example and not intended to be limiting. It should be appreciated that the server 200 may include additional components and may perform additional tasks.

Figure 3:
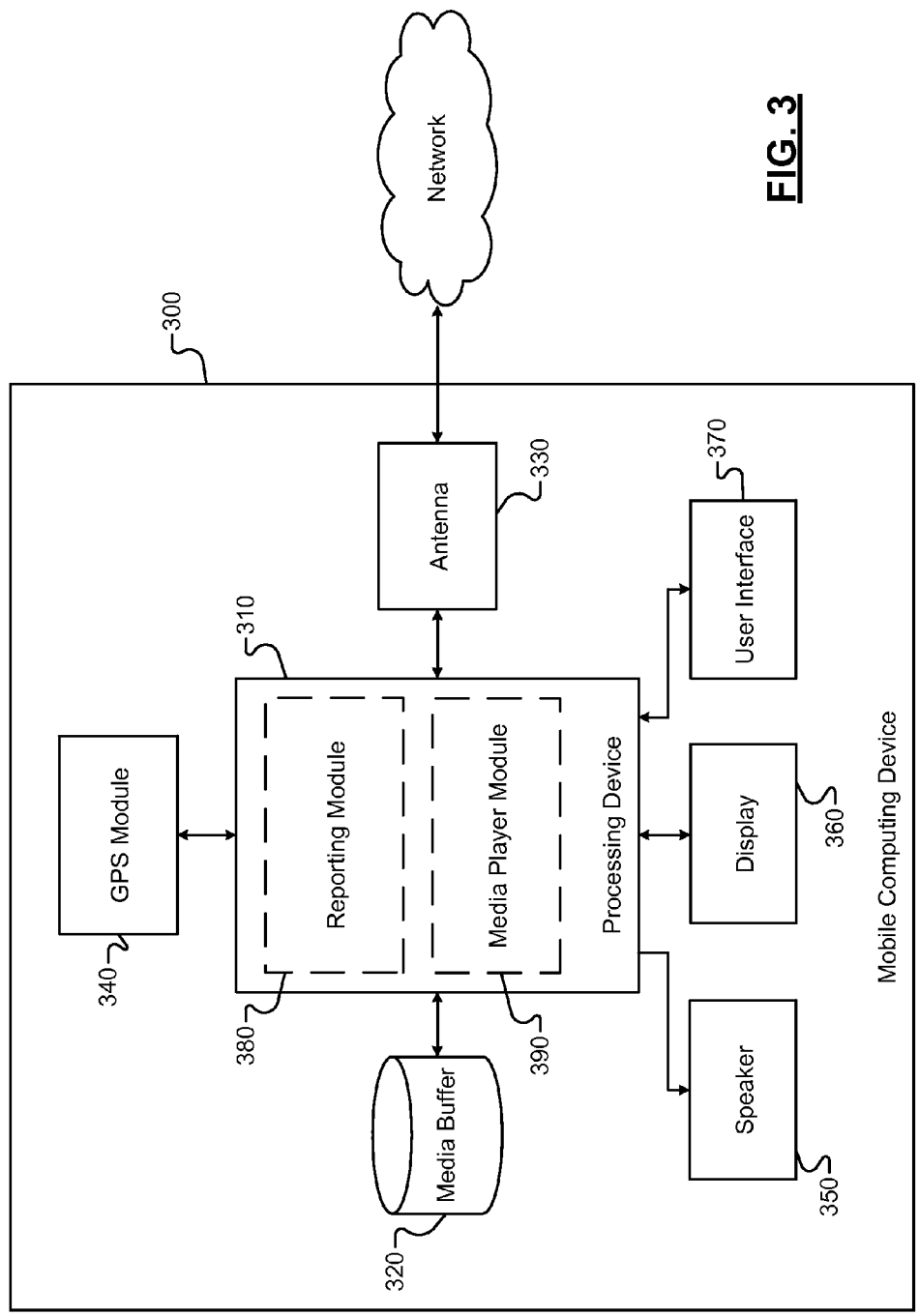
FIG. 3 is a block diagram illustrating example components of one of the plurality of mobile computing devices of FIG. 1.

Referring now to FIG. 3, an example of a mobile computing device 300 is illustrated. The example mobile computing device 300 includes a processing device 310, a media buffer 320, an antenna 330, a global positioning system (GPS) module 340, a speaker 350, a display 360, and a user interface 370. It should be appreciated that the mobile computing device 300 may include additional components not shown in FIG. 3

The processing device 310 includes one or more processors that execute computer-readable instructions which cause the mobile computing device 300 to perform its intended functionality. The processing device 310 is configured to communicate with the media buffer 320, the antenna 330, the GPS module 340, the speaker 350, the display 360, and the user interface 370. In some embodiments, a reporting module 380 and a media player module 390 may be implemented at the processing device 310.

The media buffer 320 can be implemented on a memory device (not shown) of the mobile computing device 300. The media buffer 320 can be a stand-alone memory or an allocation of a shared memory having a specific (or variable) size (herein referred to as the "buffer size"). The media buffer 320 can be allocated by the media player module 390, e.g., when the media player module 390 is executed by the processing device 310. The media buffer 320 receives and stores the media stream from the server 200, via the antenna 330 and the processing device 310, for playback by the media player module 390. The media buffer 320 can be implemented as a first in first out (FIFO) buffer.

The antenna 330 enables communication between the mobile computing device 300 and the network 100, e.g., via a base station 110. In operation, the antenna 330 transmits data signals to and receives data signals from the base station 110. The antenna 330 can be configured to communicate using any suitable communication protocol or standard, including the 2G telecommunication standards, 3G telecommunication standards, 4G telecommunication standards, or the IEEE 802.11 wireless communication protocol. While one antenna 330 is shown, it should be appreciated that the mobile computing device 300 can include a plurality of antennas 330 configured to communicate using the different communication protocols and/or standards.

The GPS module 340 receives GPS signals from one or more GPS satellites in order to determine a location of the mobile computing device 300. The GPS module 340 may include a receiver that receives the GPS signals and a processor that calculates a longitude and latitude (collectively referred to as "GPS coordinates") of the mobile computing device 300. The GPS coordinates can be communicated to the processing device 310.

In some embodiments, the reporting module 380 is configured to report network capabilities realized at the mobile computing device 300. The reporting module 380 can determine one or more of: (i) a signal strength realized at the antenna 330, (ii) a bandwidth realized by the mobile computing device 300 when performing a network operation, (iii) a data throughput realized by the mobile computing device 300 when performing a network operation, and (iv) whether a buffering operation was performed by the mobile computing device 300. When the reporting module 380 obtains one or more network capabilities, the reporting module 380 can obtain the corresponding location of the mobile computing device 300 from the GPS module 340. The reporting module 380 can then provide the realized network capabilities and a corresponding location to the server 200, as described above.

The reporting module 380 can obtain and report realized network capabilities in any suitable manner. For example, the reporting module 380 can obtain the realized network capabilities at specific times of the day or when the mobile computing device 300 has traveled a predetermined distance, e.g., every mile. Additionally or alternatively, the reporting module 380 can record realized network capabilities in response to a specific trigger. For example, when a realized signal strength, realized data throughput and/or a realized bandwidth are less than a respective threshold or when the mobile computing device 300 performs a buffering operation, the reporting module 380 may obtain the corresponding location of the mobile computing device 300 and report the realized network capabilities and the corresponding location.

The media player module 390 is configured to allow a user to request, receive and play a media stream. The media player module 390 may receive commands from a user via the user interface 370, including a command to receive a media stream. In response to a command to receive a media stream, the media player module 390 can transmit a request for the media stream to the server 200. The request can indicate one or more requested media files, a requested bit rate for the media stream, and/or additional information. For example only, the additional information may include the buffer size of the media buffer 320 and/or a predicted route of the mobile computing device 300. The mobile computing device 300 may determine the predicted route in any suitable manner, such as those described above in relation to the determination of the predicted route by the server 200. For example, the user may explicitly enter an intended route, the user may request directions from a map server using the mobile computing device 300, the mobile computing device 300 may learn routes that the user takes during certain times of the day, or the mobile computing device 300 may extrapolate a route of the mobile computing device 300 based on a current direction of the mobile computing device 300 and a map.

In some embodiments, the media player module 390 can perform any or all of the operations described above in regard to the server 200. For example only, the media player module 390 can operate to determine whether and when to request a lower bit rate media stream from the server 200. In this example, the mobile computing device can: (i) obtain/determine a predicted route of the mobile computing device 300, (ii) determine whether the predicted route travels through an area of reduced network capabilities, and (iii) provide a request for a media stream at a particular bit rate in order to avoid interruptions in playback of the media stream.

In response to the request for the media stream, the server 200 may begin to transmit the requested media stream to the mobile computing device 300. The media player module 390 may receive and store the media stream in the media buffer 320. When playing the media stream, the media player module 390 retrieves an upcoming portion of the media stream from the media buffer 320, converts the upcoming portion of the media stream to a signal, and outputs the signal via the speaker 350 and/or the display 360.

Figure 4:
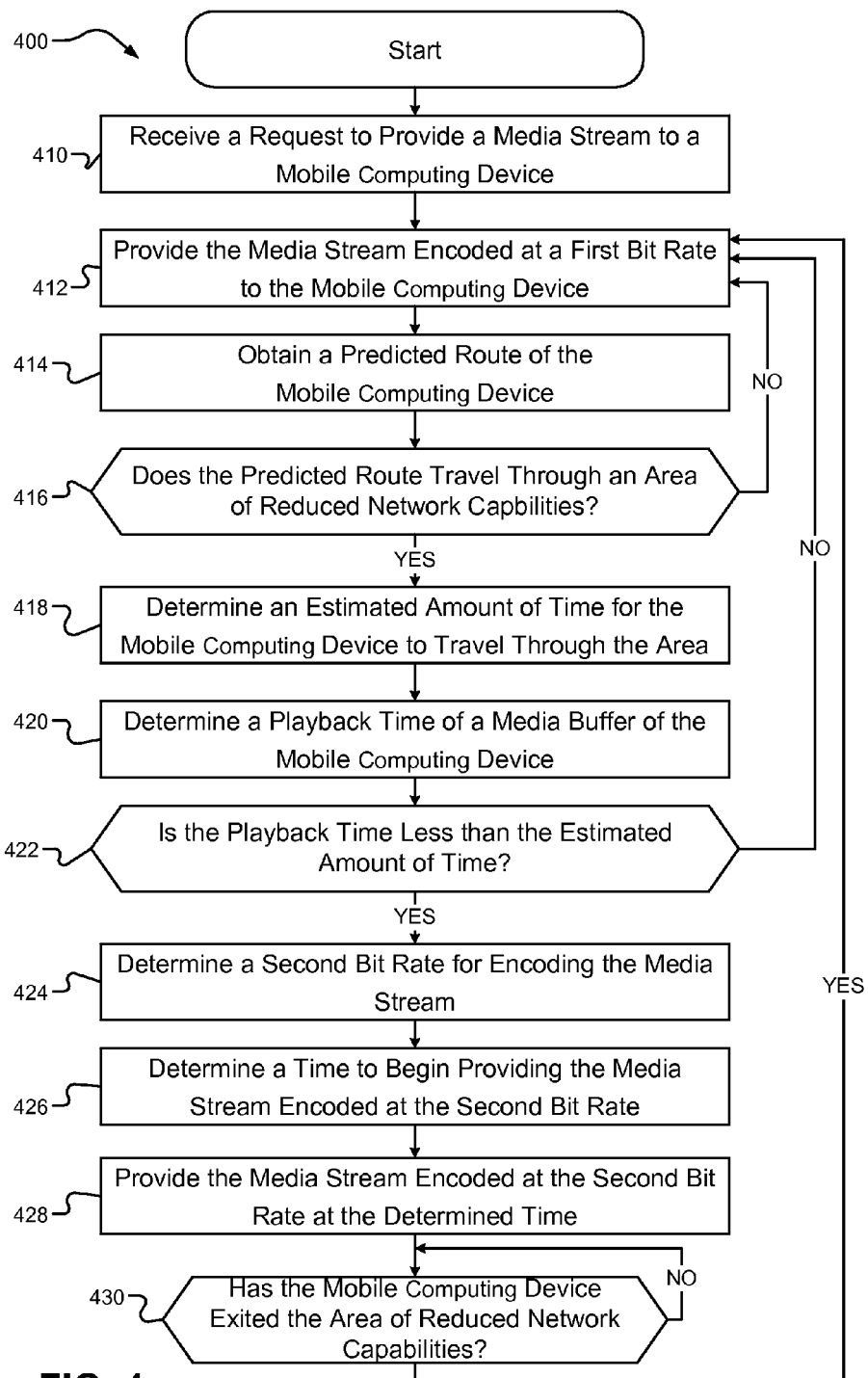
FIG. 4 is a flow chart illustrating an example technique for providing a media stream from a server to a mobile computing device according to some embodiments of the present disclosure.

Referring now to FIG. 4, an example technique 400 for providing a media stream from a server 200 to a mobile computing device 300 is illustrated. At 410, the server 200 receives a request to provide a media stream from a mobile computing device 300. At 412, the server 200 begins providing the media stream encoded at a first bit rate. The first bit rate may be the highest available bit rate or a bit rate specified in the request.

At 414, the server 200 obtains a predicted route of the mobile computing device 300. The predicted route may be determined by the server 200, or be provided to the server 200 by the mobile computing device 300 in the request for the media stream or after the server 200 has begun providing the media stream. At 416, the server 200 determines whether the predicted route travels through an area of reduced network capabilities. In some embodiments, the server 200 obtains a coverage map corresponding to the predicted route and determines whether the predicted route travels through an area of reduced network capabilities based on the coverage map. If the predicted route does not travel through an area of reduced network capabilities, the server 200 continues to provide the media stream at the first bit rate.

If the predicted route travels through the area of reduced network capabilities, the server 200 determines an estimated amount of time for the mobile computing device 300 to travel through the area, as shown at 418. As described above, the predicted route may include an expected speed(s) associated with the segments of the predicted route, e.g., speed limits on roads. Based on the expected speed(s) and the distance of the predicted route through the area of the reduced network capabilities, the server 200 can estimate the amount of time for the mobile computing device 300 to travel through the area.

At 420, the server 200 can determine a playback time of a media buffer of the mobile computing device 300, e.g., as described above. At 422, the server 200 determines whether the playback time is less than the estimated amount of time for the mobile computing device 300 to travel through the area of reduced network capabilities. If the playback time is not less than the estimated amount of time, the server 200 continues to provide the media stream at the first bit rate.

If the playback time is less than the estimated amount of time, the server 200 can determine a second bit rate lower than the first bit rate for the media stream, as shown at 424. As described above, the server 200 can determine the second bit rate based on the buffer size of the media buffer 320 and the estimated amount of time for the mobile computing device 300 to travel through the area of reduced network capabilities. The server 200 can also determine an amount of media stream encoded at the second bit rate to provide to the mobile computing device 300 based on the first bit rate, the second bit rate, the estimated amount of time, and the buffer size.

At 426, the server 200 can determine a time at which to begin providing the media stream at the second bit rate, as described more fully above. At 428, the server 200 begins providing the media stream encoded at the second bit rate at the determined time. At 430, the server 200 determines whether the mobile computing device 300 has exited the area of reduced network capabilities. Upon the mobile computing device 300 exiting, the server 200 can begin providing the media stream encoded at the first bit rate.

The foregoing technique 400 can continue to execute until the requested media stream is completed, the mobile computing device 300 reaches its final destination, or the user commands the mobile computing device 300 to stop playing the media stream. It should be appreciated that variations of the technique 400 exist and are within the scope of the disclosure.

Figure 5:
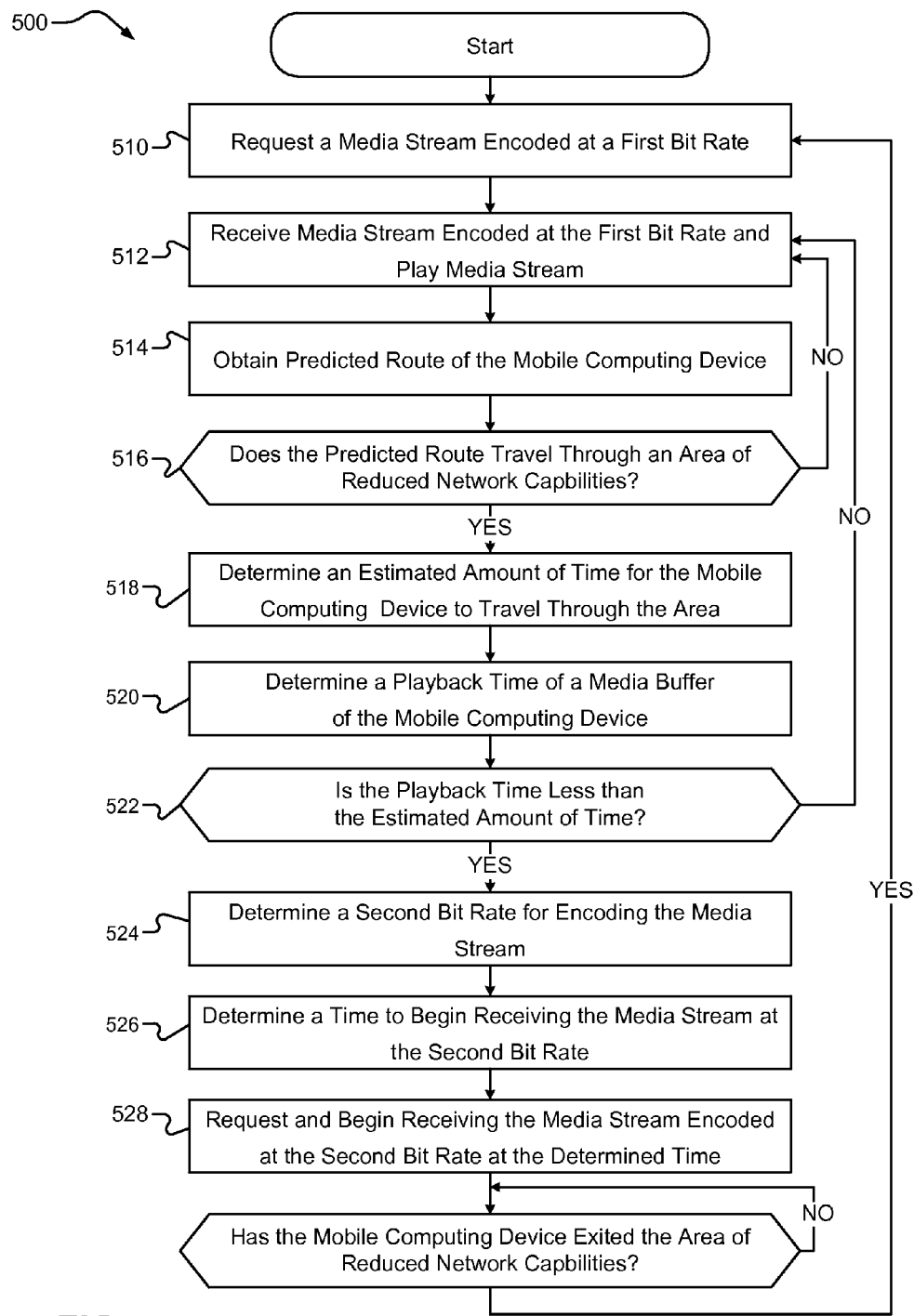
FIG. 5 is a flow chart illustrating an example technique for requesting a media stream from a server according to some embodiments of the present disclosure.

According to some embodiments of the present disclosure, the mobile computing device 300 may be further configured to determine whether to request the media stream at a lower bit rate based on a predicted route of the mobile computing device 300. FIG. 5 illustrates an example technique 500 for requesting and receiving a media stream at a mobile computing device 300 according to some embodiments of the present disclosure.

At 510, the mobile computing device 300 provides a request for a media stream to a server 200. The request can include one or more requested media files and a specified bit rate, e.g., a first bit rate. At 512, the mobile computing device 300 receives the media stream encoded at the first bit rate and begins playing the media stream. At 514, the mobile computing device 300 obtains a predicted route of the mobile computing device 300. As described above, the predicted route may be obtained in numerous ways (entered by the user, learned over time, extrapolated from the current direction that the mobile computing device 300 is traveling, etc.). At 516, the mobile computing device 300 determines whether the predicted route travels through an area of reduced network capabilities. In some embodiments, the mobile computing device 300 can obtain a coverage map corresponding to the predicted route and compare the predicted route with the areas of reduced capabilities identified in the coverage map. If the predicted route does not travel through the area of reduced network capabilities, the mobile computing device 300 can continue to receive the media stream encoded at the first bit rate.

If the predicted route does travel through the area of reduced network capabilities, the mobile computing device 300 determines an estimated amount of time for the mobile computing device 300 to travel through the area of reduced network capabilities, as shown at 518. At 520, the mobile computing device 300 determines a playback time of the media buffer 320. At 522, the mobile computing device 300 determines whether the playback time is less than the estimated amount of time. If the playback time is not less than the estimated amount of time, the mobile computing device 300 continues to receive the media stream encoded at the first bit rate.

If the playback time is less than the estimated amount of time, the mobile computing device 300 determines a second bit rate for the media stream, as shown at 524. As described above, the second bit rate can be determined in numerous ways, and the mobile computing device 300 can also determine an amount of media stream encoded at the second bit rate to request from the server 200 based on various factors. At 526, the mobile computing device 300 can determine a time at which to begin receiving the media stream encoded at the second bit rate. At 528, the mobile computing device 300 requests the media stream encoded at the second bit rate and begins receiving the media stream encoded at the second bit rate at the determined time. The request may include the second bit rate, the amount of media stream encoded at the second bit rate, and/or the determined time. At 530, the mobile computing device 300 determines whether it has exited the area of reduced network capabilities. When the mobile computing device 300 has exited the area of reduced network capabilities, the mobile computing device 300 requests that the server 200 provide the media stream encoded at the first bit rate.

The foregoing technique 500 can continue to execute until delivery of the requested media stream is completed, the mobile computing device 300 reaches its final destination, or the user commands the mobile computing device 300 to stop playing the media stream. It should be appreciated that variations of the technique 500 are contemplated and are within the scope of the disclosure.

Figure 6:
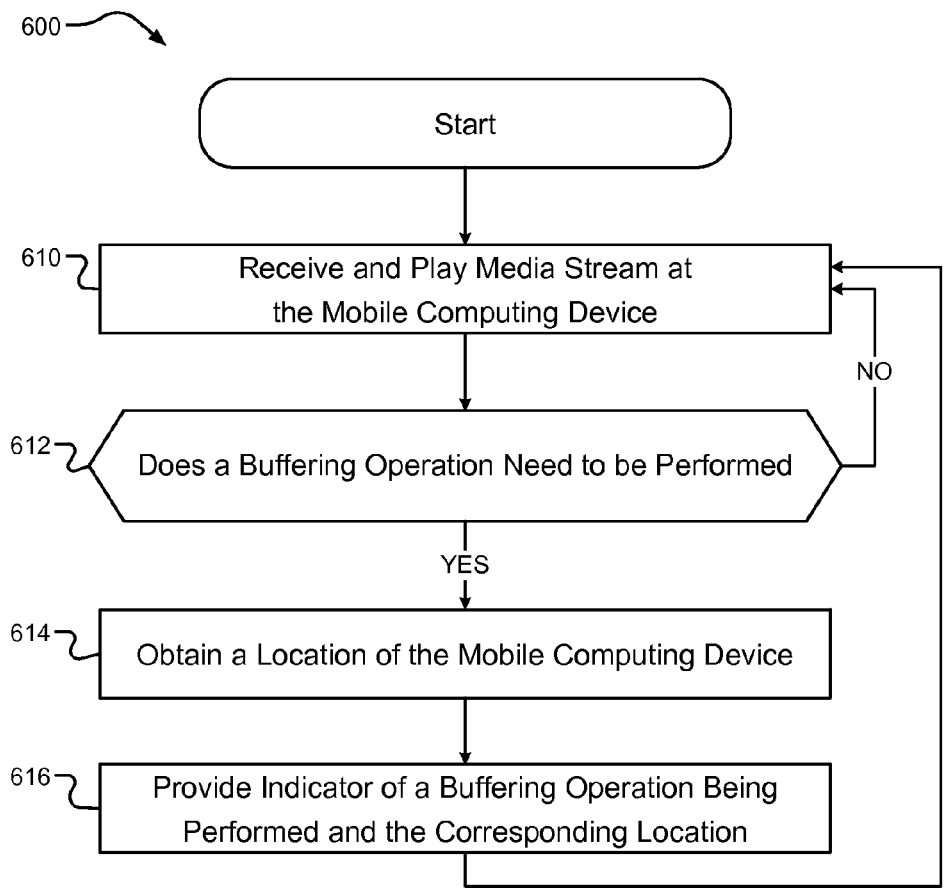
FIG. 6 is a flow chart illustrating an example technique for reporting realized network capabilities according to some embodiments of the present disclosure.

Referring now to FIG. 6, an example technique 600 for reporting network capabilities is illustrated. In the example technique 600 the mobile computing device 300 determines that the network capabilities are reduced if the mobile computing device 300 performs a buffering operation.

At 610, the mobile computing device 300 can receive and play a media stream. At 612, the mobile computing device 300 can determine whether a buffering operation is required. For example, if the media buffer 320 is emptied or falls below a minimum threshold, the mobile computing device 300 may perform a buffering operation (pausing playback of the media stream until the media buffer 320 is at least partially replenished). If the buffering operation is performed, the mobile computing device 300 can obtain its location, as shown at 614. In some embodiments, the mobile computing device 300 can obtain its GPS coordinates from its GPS module 340. At 616, the mobile computing device 300 can provide an indication that a buffering operation was performed and the corresponding location to the server 200.

The foregoing technique 600 is provided for example only. It should be appreciated that variations of the technique 600 are contemplated and are within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
   providing, from a server including one or more processors, a media stream encoded at a first bit rate to a mobile computing device;
   obtaining, at the server, a predicted route of the mobile computing device, the predicted route corresponding to a route likely to be traveled by the mobile computing device;
   determining, at the server, whether the predicted route travels through an area of reduced network capabilities; and
   when the predicted route travels through the area of reduced network capabilities:
      obtaining, at the server, a network performance estimate corresponding to a data rate that the mobile computing device is expected to receive within the area of reduced network capabilities;
      determining, at the server, an estimated amount of time for the mobile computing device to travel through the area of reduced network capabilities,
      determining, at the server, a playback time of a media buffer of the mobile computing device based on a buffer size of the media buffer and the network performance estimate, the playback time corresponding to an amount of time to exhaust the media buffer when the mobile computing device is traveling in the area of reduced network capabilities,
      when the playback time value is less than the estimated amount of time:
         determining, at the server, a second bit rate for encoding the media stream based on the buffer size and the estimated amount of time, the second bit rate being less than the first bit rate,
         determining, at the server, a time to begin providing the media stream encoded at the second bit rate based on the buffer size, the estimated amount of time, the first bit rate, and the second bit rate, and
         beginning to provide, from the server, the media stream encoded at the second bit rate to the mobile computing device at the time.

2. The method of claim 1, further comprising:
   determining, at the server, a first amount of data and a second amount of data to be stored in the media buffer when the mobile computing device is traveling through the area of reduced network capabilities, the first amount of data corresponding to the media stream encoded at the first bit rate and the second amount of data corresponding to the media stream encoded at the second bit rate,
   wherein the first amount of data and the second amount of data are determined such that the playback time is greater than or equal to the estimated amount of time.

3. The method of claim 2, wherein determining the first amount of data and the second amount of data comprises prioritizing the first amount of data over the second amount of data.

4. The method of claim 3, wherein the second amount of data is determined based on:

$$A = \frac{b_2(T*b_1 - S)}{b_1 - b_2}$$

where A is the second amount of data, T is the estimated amount of time, $b_1$ is the first bit rate, $b_2$ is the second bit rate, and S is the buffer size.

5. The method of claim 1, further comprising obtaining, at the server, a coverage map indicating one or more areas of reduced network capabilities, including the area of reduced network capabilities, wherein the determining whether the predicted route travels through the area of reduced network capabilities is based on the coverage map.

6. The method of claim 5, further comprising maintaining, at the server, a locations database that stores realized network capabilities that have been realized at a plurality of different locations by a plurality of reporting mobile computing devices.

7. The method of claim 6, wherein obtaining the coverage map further comprises generating, at the server, the coverage map based on the realized network capabilities.

8. The method of claim 6, wherein the realized network capabilities at a specific location of the plurality of different locations include at least one of:
 a signal strength realized by a specific reporting mobile computing device of the plurality of reporting mobile computing devices at the specific location;
 a realized bandwidth realized by the specific reporting mobile computing device at the specific location; and
 an indication that a buffering operation was performed by the specific reporting mobile computing device at the specific location.

9. A computer-implemented method, comprising:
 providing, from a mobile computing device including one or more processors, a first request for a media stream encoded at a first bit rate to a server;
 receiving, at the mobile computing device, the media stream encoded at the first bit rate;
 obtaining, at the mobile computing device, a predicted route of the mobile computing device, the predicted route corresponding to a route likely to be traveled by the mobile computing device;
 determining, at the mobile computing device, whether the predicted route travels through an area of reduced network capabilities; and
 when the predicted route travels through the area of reduced network capabilities:
  providing, from the mobile computing device and to the server, a second request for the media stream encoded at a second bit rate, the second bit rate being lower than the first bit rate, the second request being provided before the mobile computing device travels through the area of reduced network capabilities;
  receiving, at the mobile computing device, the media stream encoded at the second bit rate,
 determining, at the mobile computing device, an estimated amount of time for the mobile computing device to travel through the area of reduced network capabilities; and
 determining, at the mobile computing device, an amount of media stream encoded at the second bit rate to be requested based on the first bit rate, the second bit rate, the estimated amount of time, and a buffer size of a media buffer of the mobile computing device,
 wherein the amount of media stream encoded at the second bit rate is determined based on:

$$A = \frac{b_2(T*b_1 - S)}{b_1 - b_2}$$

where A is the amount of media stream encoded at the second bit rate, T is the estimated amount of time, $b_1$ is the first bit rate, $b_2$ is the second bit rate, and S is the buffer size, and
 wherein the second request includes the amount of media stream encoded at the second bit rate.

10. The method of claim 9, further comprising determining, at the mobile computing device, a time for the server to begin providing the media stream encoded at the second bit rate based on the first bit rate and the amount of media stream encoded at the second bit rate, wherein the second request includes the time.

11. The method of claim 9, further comprising obtaining, at the mobile computing device, a coverage map indicating one or more areas of reduced network capabilities, including the area of reduced network capabilities, wherein the determining whether the predicted route travels through the area of reduced network capabilities is based on the coverage map.

12. A computer-implemented method, comprising:
 providing, from a mobile computing device including one or more processors, a first request for a media stream encoded at a first bit rate to a server;
 receiving, at the mobile computing device, the media stream encoded at the first bit rate;
 obtaining, at the mobile computing device, a predicted route of the mobile computing device, the predicted route corresponding to a route likely to be traveled by the mobile computing device;
 determining, at the mobile computing device, whether the predicted route travels through an area of reduced network capabilities;
 when the predicted route travels through the area of reduced network capabilities:
  providing, from the mobile computing device and to the server, a second request for the media stream encoded at a second bit rate, the second bit rate being lower than the first bit rate, the second request being provided before the mobile computing device travels through the area of reduced network capabilities, and
  receiving, at the mobile computing device, the media stream encoded at the second bit rate;
 storing, at the mobile computing device, the media stream in a media buffer of the mobile computing device as the media stream is received from the server;
 playing, at the mobile computing device, the media stream stored in the media buffer;
 monitoring, at the mobile computing device, an amount of data in the media buffer while the media stream is being played;
 when the amount of data in the media buffer is below a threshold, performing, at the mobile computing device, a buffering operation; and
 when the buffering operation is performed:
  obtaining, at the mobile computing device, a current location of the mobile computing device, and
  reporting the current location to the server.

13. The method of claim 9, further comprising, when the mobile computing device exits the area of reduced network capabilities, providing, from the mobile computing device to the server, a third request for the media stream encoded at the first bit rate.

14. The method of claim 12, further comprising:
determining, at the mobile computing device, an estimated amount of time for the mobile computing device to travel through the area of reduced network capabilities; and
determining, at the mobile computing device, an amount of media stream encoded at the second bit rate to be requested based on the first bit rate, the second bit rate, the estimated amount of time, and a buffer size of a media buffer of the mobile computing device,
wherein the second request includes the amount of media stream encoded at the second bit rate.

15. The method of claim 14, further comprising determining, at the mobile computing device, a time for the server to begin providing the media stream encoded at the second bit rate based on the first bit rate and the amount of media stream encoded at the second bit rate, wherein the second request includes the time.

16. The method of claim 12, further comprising obtaining, at the mobile computing device, a coverage map indicating one or more areas of reduced network capabilities, including the area of reduced network capabilities, wherein the determining whether the predicted route travels through the area of reduced network capabilities is based on the coverage map.

17. The method of claim 12, further comprising, when the mobile computing device exits the area of reduced network capabilities, providing, from the mobile computing device to the server, a third request for the media stream encoded at the first bit rate.

18. The method of claim 9, further comprising:
storing, at the mobile computing device, the media stream in a media buffer of the mobile computing device as the media stream is received from the server;
playing, at the mobile computing device, the media stream stored in the media buffer;
monitoring, at the mobile computing device, an amount of data in the media buffer while the media stream is being played;
when the amount of data in the media buffer is below a threshold, performing, at the mobile computing device, a buffering operation; and
when the buffering operation is performed:
obtaining, at the mobile computing device, a current location of the mobile computing device, and
reporting the current location to the server.

19. The method of claim 14, wherein the amount of media stream encoded at the second bit rate is determined based on:

$$A = \frac{b_2(T * b_1 - S)}{b_1 - b_2}$$

where A is the amount of media stream encoded at the second bit rate, T is the estimated amount of time, $b_1$ is the first bit rate, $b_2$ is the second bit rate, and S is the buffer size.

20. The method of claim 6, wherein the realized network capabilities at a specific location of the plurality of different locations include an indication that a buffering operation was performed by a specific reporting mobile computing device of the plurality of reporting mobile computing devices at the specific location.

* * * * *